April 25, 1961 R. W. ARNOLD 2,981,651
SEALING MEMBERS AND METHODS
Filed Aug. 2, 1956

Robert W. Arnold,
Inventor.
Koenig and Pope,
Attorneys.

United States Patent Office 2,981,651
Patented Apr. 25, 1961

2,981,651

SEALING MEMBERS AND METHODS

Robert W. Arnold, Belleville, Ill., assignor to American-Marietta Company, Chicago, Ill., a corporation of Illinois Filed Aug. 2, 1956, Ser. No. 601,691

5 Claims. (Cl. 154—129)

This invention relates to sealing materials and methods, more particularly to tacky sealing members, such as washers, methods of bonding such tacky sealing members to metal members, such as metal fastener elements, and metal fastener elements having such tacky sealing members bonded thereto.

Heretofore, in order to enable tacky sealing members, such as tacky mastic sealing washers, to be readily handled, packaged and shipped without undesired sticking, such as the sticking together of a plurality of sealing members, it has been customary to provide such members with some means for preventing them from sticking together such as a tissue paper facing which disintegrates on washing or a coating of powdered talc. Such means not only serves no useful purpose so far as the sealing operation is concerned, but actually interferes to some extent with bonding of the sealing member to a metal member.

Among the several objects of the present invention may be noted the provision of sealing members of the class described provided with a special means for preventing them from sticking which, rather than interfering with the bonding of a sealing member to a metal member, makes it possible to provide for a much more secure bonding of the sealing member to a metal member than that which can be obtained solely from the tackiness of the sealing member; the provision of an economical and convenient method of attaining the stated secure bonding of a sealing member to a metal member; and the provision of a metal fastener element having a sealing member of this invention bonded thereto wherein the exposed surface of the sealing element retains its non-sticking characteristic. Other objects and features will be in part apparent and in part pointed out hereinafter.

The invention accordingly comprises the products and methods hereinafter described, the scope of the invention being indicated in the following claims.

In the accompanying drawings, in which one of various possible embodiments of the invention is illustrated, Fig. 1 is a view in perspective of a washer-type sealing member of this invention;

Similar reference characters indicate corresponding parts throughout the several views of the drawings.

Figure 1:
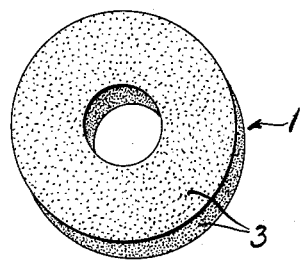

Referring to the drawings, there is shown in Fig. 1 a sealing member 1 in the form of a washer made from a tacky, mastic sealing material provided on the entire surface area thereof with finely divided discrete particles 3 of a non-tacky thermoplastic or thermosetting resin. While the invention is herein described with particular reference to a washer, it will be understood that the invention is applicable to sealing members of other shapes, being applicable to gaskets, for example, or other special shapes depending upon the particular purpose for which the sealing members are to be used. Also, the sealing member may be composed of any tacky, mastic sealing material, which may or may not be of an extrudable nature. It may be made of materials such as disclosed in U.S. Patent 2,718,691, dated September 27, 1955.

The following examples illustrate sealing materials which may be used:

Example 1

A material from which sealing members used in the present invention are formed is made of the following components:

| | Parts by weight |
|---|---|
| Elastomer—copolymer of butadiene and styrene containing 23.5% styrene (obtainable under the trade-name "GRS–25") | 8.4 |
| Tackifier and elastomer—polyisobutylene having an average molecular weight of approximately 11,000 (obtainable under the trade-name "Vistanex LMMS") | 8.4 |
| Plasticizer and extender—blown asphalt having an M.P. of 240 and an N.P. of 2.5 mm. (obtainable under the trade-name "#4 Korite") | 56.8 |
| Antioxidant—trimethyl dihydroxy quinoline (obtainable under the trade-name "Agerite Resin D") | 0.3 |
| Filler—carbon black of the semi-reinforcing furnace type (obtainable under the trade-name "Thermax") | 2.9 |
| Filler—pulverized tree bark, 28 mesh (obtainable under the trade-name "508 Silvacon") | 11.6 |
| Filler—pulverized tree bark, 100 mesh (obtainable under the trade-name "490 Silvacon") | 11.6 |

This material was tested for plasticity and consistency and according to the standard ASTM (American Society for Testing Materials) D5–49 Test for bituminous materials it gave a needle penetration of 3.5 mm. at 77° F. The test differed from standard procedure only in that the material was packed into the test container instead of being poured in.

The proportions of the components in the above example may be varied considerably and the limits in percent by weight are as follows: Both the elastomer and the tackifier and elastomer may be varied between 5% to 40%. The plasticizer and extender may be varied 0% to 60% and the antioxidant between 0% and 2%. The carbon black filler may be varied between 0% to 15% while the other two fillers may be varied between 5% to 30%. Also, any polyisobutylene having a molecular weight between 7000 to 15,000 is suitable.

Example 2

A material from which sealing members used in the present invention are formed is made of the following components:

| | Parts by weight |
|---|---|
| Elastomer and tackifier—polyisobutylene having an average molecular weight of approximately 11,000 (obtainable under the trade-name "Vistanex LMMS") | 49.0 |
| Filler—chrysolite asbestos fibers | 18.0 |
| Filler—chrysolite asbestos floats | 32.0 |
| Waterproofing agent—aluminum distearate | 1.0 |

This material was tested by the ASTM D5.49 Test and a needle penetration of 3.5 to 6.0 mm. was obtained. In this example the plasticizer and extender were omitted. The waterproofing agent serves to close the pores of the fibrous filler. This material is non-staining and odorless and may be painted.

The proportions of the components in the above example can be varied considerably and the limits in percent by weight are as follows: The elastomer and tackifier component may be varied between 30% and 50%. The asbestos fiber filler may be varied between 10% and 50% while the asbestos float filler may be varied between 20% and 40%. The waterproofing agent may be present in percentages between 0.5% and 2%. Also, any metallic soap may be used in place of the aluminum distearate.

*Example 3*

A material from which sealing members used in the present invention are formed is made of the following components:

| | Parts by weight |
|---|---|
| Elastomer—reclaimed butadiene styrene copolymer (obtainable under the trade-name "Midwest S–201") | 57.7 |
| Plasticizer and extender—mineral oil (obtainable under the trade-name "Indonex 632½") | 25.0 |
| Adhesive-modified phenol formaldehyde resin (obtainable under the trade-name "Durex 12687") | 11.0 |
| Vulcanizing agent—sulfur | 0.55 |
| Accelerator—tetramethyl thiuram disulfide (obtainable under the trade-name "Methyl Tuads") | 0.05 |
| Accelerator-mercaptobenzo thiazole (obtainable under the trade-name "Captax") | 0.05 |
| Accelerator activator and filler-zinc oxide | 2.75 |
| Accelerator retarder—benzoic acid | 0.15 |
| Antioxidant—polymerized trimethyl dihydroxy quinoline (obtainable under the trade-name "Agerite Resin D") | 2.75 |

Needle penetration by the ASTM D5–49 Test was between 6.0 and 9.0 mm.

This material may be vulcanized by application of heat after the seal has been made and the material extruded into the voids 19. The soft, tacky material is thereby changed to an expanding, tough, resilient, substance. The adhesive greatly improves the bond between the metal parts being sealed after vulcanizing because it is a thermosetting resin. Prior to vulcanizing, the adhesive acts as a filler.

The proportions of the components in the above example may be varied considerably and the limits in percent by weight are as follows: The elastomer may be present in amounts between 20% and 60%, and the plasticizer and extender in amounts between 20% and 40%. The adhesive may vary in quantities between 10% and 20%. The vulcanizing agent may be present in amounts as low as .1% and as high as 1.0%. The disulfide and thiazole accelerators may each vary between .01% and 1.0%. Both the accelerator activator and filler and the antioxidant components may vary between 1% and 3%, while the accelerator retarder is present in proportions between .1% and .3%. Other metallic oxides than zinc oxide are useful as accelerator activators and fillers.

*Example 4*

Example 3 was repeated except that the percentage of the elastomer was reduced to 55.0% and a swelling agent, diazoamino benzene (obtainable under the trade-name "Unicel"), was added in the amount of 2.7% by weight. The ASTM D5–49 Test gave the same result as in Example 3. This material was also vulcanized after the seal was made to change the physical nature of the sealing material to a resilient condition. There was more expansion during the vulcanizing operation than with the material of Example 3.

The same variations in proportions of components is permissible in the above example as was listed in Example 3, the swelling agent of this example being present in amounts between 1% to 3%.

*Example 5*

A material from which sealing members used in the present invention are formed is made of the following components:

| | Parts by weight |
|---|---|
| Elastomer—polysulfide polymer (obtainable under the trade-name "Thiokol FA") | 57.0 |
| Plasticizer—2,2-benzothiazyl disulfide | 1.7 |
| Filler—chrysolite asbestos fibers | 39.5 |
| Corrosion inhibitor—zinc chromate | 1.8 |

The needle penetration in accordance with the ASTM D5–49 Test was between 5.0 and 10.0 mm. In this example it will be noted that the ingredients, particularly the elastomer, are oil-resistant.

The proportions of the components in the above example may be varied considerably and the limits in percentage by weight are as follows: The elastomer may be varied between 30% and 70%. The plasticizer may be present in amounts between 1% and 5%. The filler may compose between 25% and 50% of the material and the corrosion inhibitor may vary between 0% and 5%.

For the purpose of the present invention, the nature of the sealing material is not of primary importance. However, the sealing material must possess sufficient tackiness to hold particles of a resin on the surfaces thereof as described hereinafter.

With regard to the particles 3 of the resin material of the surfaces of sealing member 1, any non-tacky thermoplastic or thermosetting resin which prevents adherence or sticking together of individual sealing members in the resin's uncured state and which provides good adherence of the sealing member to metal surfaces in the resin's cured state, may be used. It is preferred that the resin be in finely divided or powder form for best results in practicing the invention. Thermoplastic and thermosetting resins of the above properties which cure or set at temperatures between approximately 180–400° F. have been found useful to provide good adhesion to metal. For thermoplastic resins of this type, the preferred temperature range is between approximately 275–350° F., while for thermosetting resins the preferred temperature range is between approximately 180–220° F.

With regard to the thermoplastic resins, coumarone-indene or styrene thermoplastic resins or homologs from coal tar or petroleum sources may be used. Modified polyvinyl chloride resins are also suitable. Exemplary of thermoplastic resins which are suitable for use in the present invention are those sold under the trade designations "Velsicol AD–21" (a thermoplastic resin from petroleum sources marketed by Velsicol Corp.), "Velsicol AB–11–4" (a nonoxidizing type, solid synthetic thermoplastic resin of petroleum origin marketed by Velsicol Corp.), "Neville LX–685" (a thermoplastic resin marketed by Neville Co.), "Piccoumarone C–5" (Paracoumarone-indene thermoplastic resin marketed by Pennsylvania Industrial Chemical Corp.) and "Vinylite VMCH" (a vinyl chloride-vinyl acetate copolymer marketed by Carbide & Carbon Chemicals Co.). Among the thermosetting resins which may be employed may be mentioned those sold under the trade designations "Durez 12687" (a thermosetting resin marketed by Durez Plastics & Chemicals, Inc.), "Foundrez 7500" (a thermosetting resin marketed by Reichhold Chemicals, Inc.) and "Schenectady Resin SP–103" (a thermosetting resin marketed by Schenectady Varnish Company). The use of a two-stage thermosetting phenol-formaldehyde resin such as "Durez 12687" is preferred in the practice of the invention. It will be understood that other non-tacky thermoplastic and thermosetting resins having the properties described above may be employed in the practice of the invention.

In the manufacture of the sealing members 1, ring-shaped mastic pieces are first die-cut in the wet state from sheet stock of the mastic sealing material which is being used, and after drying, are screened free of any residual release agent. The cleaned mastic pieces are then tumbled with the powdered thermoplastic or thermosetting resin and any excess powdered resin is removed from the pieces by screening. This procedure provides a sufficient quantity of the resin on the surfaces of the mastic pieces to insure good adhesion of the pieces to metal surfaces in the subsequent bonding operation. For this purpose, it has been found that a mastic piece should have on the surface thereof between approximately 0.05% and 10% of resin, based upon the weight of the mastic piece. As thus formed, the sealing members are suitable for handling, packaging and shipping without the use of paper or other means for preventing undesired sticking, and the uncured resin on the surfaces of the member effectively prevents them from undesired sticking for an indefinite period of time.

Figure 2:
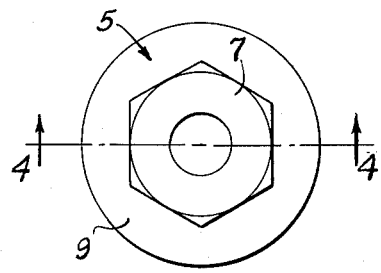
Fig. 2 is a plan view of a metal fastener of the present invention.
Figure 3:
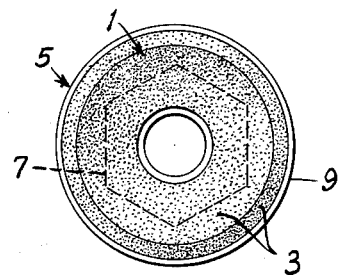
Fig. 3 is a bottom plan view of Fig. 2.
Figure 4:
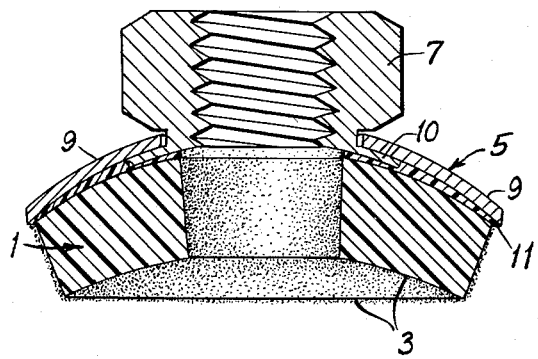
Fig. 4 is an enlarged section taken on line 4—4 of Fig. 2.

Sealing members 1 may be handled, packaged and shipped in this form or they may be further assembled with a metal fastener element such as a so-called "nut-washer," in accordance with the method of the present invention, as illustrated in Figs. 2–4. In general, the sealing member may be bonded to a metal member by contacting the sealing member with the metal member after heating the latter to a temperature of at least 180° F., under a pressure sufficient to result in intimate contact between the surfaces of the respective members. While the pressure required varies with the temperature of the metal member, pressures of the order of approximately 10–30 p.s.i. have been found to give satisfactory results. Upon contacting the hot metal member, the resin powder on the contacting surface of the sealing member, in the case of the use of the preferred two-stage resin above mentioned for example, first melts and finally sets or cures into a mass which is strongly adherent to metal and forms a highly effective bond between the sealing and metal members.

As shown in Figs. 2–4, a nut-washer is designated in its entirety by the reference character 5. It comprises an assembly of a nut 7 and a cupped metal washer 9. The metal washer 9 is held in assembly with the nut by a bent-out flanged portion 10 of the nut. A sealing member 1 of this invention (having the powdered resin 3 dusted on its entire surface area) is bonded to the metal washer 9 by heating the nut-washer (including the metal washer) to a temperature of at least 180° F., preferably to a temperature between approximately 300° F.–400° F., then pressing the sealing member 1 against the face of the washer. In the case, for example, of the use of the two-stage resin above mentioned, the resin on the face of the sealing member 1 contacting the heated washer first melts and then sets or cures into an infusible mass which is strongly adherent to the sealing member and the washer. The layer of the infusible mass formed upon curing of the resin is indicated at 11. The assembly of the nut washer and sealing member is useful in securing two plates together, in conjunction with a bolt, in a manner similar to that described in the abovementioned U.S. Patent 2,718,691. It will be observed that the powdered resin on the portion of the surface area of the sealing member 1 not in contact with the metal washer remains in its uncured state to remain effective as an anti-sticking agent for preventing undesired sticking.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

I claim:

1. The method of bonding together a metal member and a sealing member composed of a body of soft, tacky, coherent sealing material which is sufficiently stiff to maintain its shape under normal handling and which is adapted to cold-flow under pressure, comprising dusting the entire surface area of the sealing member with 0.05–10% by weight, based upon the weight of the sealing member, of finely divided discrete nontacky particles of synthetic resin in an uncured nontacky state which is adapted to cure at a temperature between approximately 180–400° F. to form a sealing member having nontacky surfaces, heating the metal member to a temperature between approximately 180–400° F., and pressing said heated metal member and sealing member together under a pressure of approximately 10–30 p.s.i. to effect curing of the particles of said resin on the surfaces of the sealing member in contact with the metal member, the particles of said resin on the surfaces of the sealing member not in contact with the metal member remaining in an uncured nontacky state.

2. The method of bonding together a metal member and a sealing member composed of a body of soft, tacky, coherent sealing material which is sufficiently stiff to maintain its shape under normal handling and which is adapted to cold-flow under pressure, comprising dusting the entire surface area of the sealing member with 0.05–10% by weight, based upon the weight of the sealing member, of finely divided discrete nontacky particles of a powdered thermosetting synthetic resin in an uncured nontacky state which is adapted to cure at a temperature between approximately 180–220° F. to form a sealing member having nontacky surfaces, heating the metal member to a temperature between approximately 180–220° F., and pressing said heated metal member and sealing member together under a pressure of approximately 10–30 p.s.i. to effect curing of the particles of said resin on the surfaces of the sealing member in contact with the metal member, the particles of said resin on the surfaces of the sealing member not in contact with the metal member remaining in an uncured nontacky state.

3. The method of bonding together a metal member and a sealing member composed of a body of soft, tacky, coherent sealing material which is sufficiently stiff to maintain its shape under normal handling and which is adapted to cold-flow under pressure, comprising dusting the entire surface area of the sealing member with 0.05–10% by weight, based upon the weight of the sealing member, of finely divided discrete nontacky particles of a powdered thermoplastic synthetic resin in an uncured nontacky state which is adapted to cure at a temperature between approximately 275–350° F. to form a sealing member having nontacky surfaces, heating the metal member to a temperature between approximately 275–350° F., and pressing said heated metal member and sealing member together under a pressure of approximately 10–30 p.s.i. to effect curing of the particles of said resin on the surfaces of the sealing member in contact with the metal member, the particles of said resin on the surfaces of the sealing member not in contact with the metal member remaining in an uncured nontacky state.

4. A fastener element comprising a metal washer, a sealing washer composed of a body of soft, tacky, coherent sealing material on one face of the metal washer, said sealing washer having on the entire surface area thereof approximately 0.05–10% by weight, based upon the weight of the sealing member, of finely divided discrete nontacky particles of a synthetic resin, the particles of the resin on the surfaces of the sealing washer in contact with the metal washer being cured and acting to bond the sealing washer to the metal washer, the particles of the resin on the surfaces of the sealing washer not in contact with the metal washer constituting a nontacky surface and acting to prevent undesired sticking of the sealing washer.

5. A fastener element as set forth in claim 4 wherein the uncured resin is in powder form.

References Cited in the file of this patent
UNITED STATES PATENTS

| | | |
|---|---|---|
| 1,250,959 | Brown | Dec. 25, 1917 |
| 1,620,043 | Stanley | Mar. 8, 1927 |
| 2,235,078 | Meisterhans | Mar. 18, 1941 |
| 2,398,890 | Howard | Apr. 23, 1945 |
| 2,499,134 | De Bruyne | Feb. 28, 1950 |
| 2,526,311 | Wilson | Oct. 17, 1950 |
| 2,548,029 | Kurtz et al. | Apr. 10, 1951 |
| 2,631,961 | Antheil | Mar. 17, 1953 |
| 2,697,873 | Cooke | Dec. 28, 1954 |
| 2,711,985 | Olson | June 28, 1955 |
| 2,718,691 | Sussenbach | Sept. 27, 1955 |
| 2,728,703 | Kiernan et al. | Dec. 27, 1955 |
| 2,732,324 | Morris | Jan. 24, 1956 |
| 2,762,116 | Rudner | Sept. 11, 1956 |
| 2,772,903 | Sussenbach | Dec. 4, 1956 |
| 2,793,136 | Root | May 21, 1957 |